UNITED STATES PATENT OFFICE.

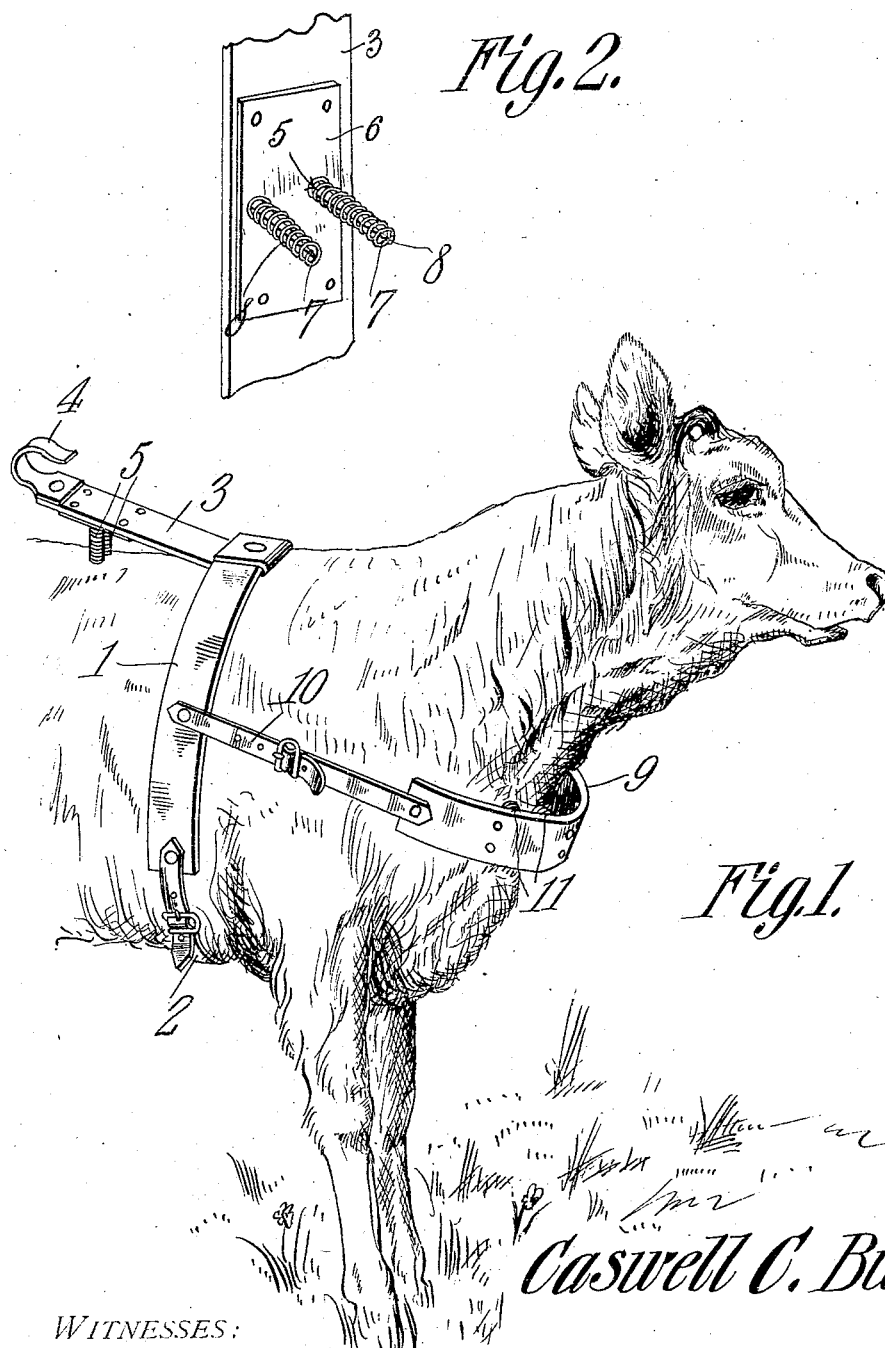

CASWELL C. BUSH, OF INKUM, TEXAS.

ANIMAL-POKE.

No. 894,185.

Specification of Letters Patent.

Patented July 28, 1908.

Application filed June 24, 1907. Serial No. 380,528.

*To all whom it may concern:*

Be it known that I, CASWELL C. BUSH, a citizen of the United States, residing at Inkum, in the county of Taylor and State of Texas, have invented a new and useful Animal-Poke, of which the following is a specification.

This invention relates to improvements in devices for assisting in confining animals within inclosures, and it has for its object to provide an improved device of this character that may be readily applied to the animal and in practice serves to effectually restrain the animal in its efforts to push itself past the fence or other barrier constituting the inclosure without liability of injuring the animal to which it is applied, the device being so simple in its construction that it may be made to sell cheaply.

To these and other ends, the invention comprises the various novel features of construction and combination and arrangement of parts, which will be hereinafter more fully described, and pointed out particularly in the appended claims.

In the accompanying drawings:—Figure 1 is a perspective view of a device constructed in accordance with the present invention, the device being shown applied to an animal. Fig. 2 is a perspective view showing two of the spurs in detail.

Corresponding parts in the several figures are indicated throughout by similar characters of reference.

The device shown in the present embodiment of the invention comprises a girdle or belt 1 composed of leather or other suitable material and of a length corresponding to the girth measure of the animal to which it is to be applied, and it is provided with a strap and buckle or an equivalent device 2, whereby it may be secured to the animal. Attached to the girth is a back strap 3 which is preferably composed of leather or other flexible material, and this strap is provided at its rear end with an upturned hook 4, the under side of the strap 3 being provided with two or more pricking devices 5, the latter, in the present instance, being attached to the strap by means of an attaching plate 6 and embodying spurs or pointed pins 7 rigidly attached to the plate and surrounded by yieldable guards each consisting of helical springs 8, the latter being interposed between the pointed ends of the spurs and the attaching plate and serving to withdraw the spurs from the flesh of the animal after the pressure on the upper side of the strap 3 has been relieved. Extending across the breast of the animal is a breast piece 9 composed of a strap of leather or other suitable material which conforms approximately to the shape of the breast, and the breast piece is held in place by means of straps or other suitable devices 10 which connect its free ends with the girdle. Arranged on the inner side of the breast piece are a suitable number of pricking devices 11 which are constructed in the same manner as those attached to the strap 3.

In practice, the pricking devices on the breast piece are pressed into the flesh of the animal when the latter forces itself against the top or the railings of a fence or other inclosure, the deterrent effect of the pricking preventing the animal exerting sufficient force to push over or otherwise damage the fence, while the hook 4 arranged on the back of the animal is so placed that it will engage the upper railing of the fence when the animal endeavors to escape between the railings, or it will engage the bottom of the fence in case it endeavors to escape beneath it, so that the device is not only adapted for use on cows and horses, but it is also well adapted for use on hogs and various other animals. As the hook 4 engages a portion of the fence, it will be drawn rearwardly, causing the flexible strap 3 to which it is attached to be depressed, the spurs thereon being pressed into the flesh on the back of the animal. In each case, the helical springs surrounding the spurs serve to immediately withdraw them the moment the pressure is relieved, so that there is no danger of tearing or unduly injuring the flesh of the animal. It will be noticed that the guards consisting of the springs 8 constitute means for yieldingly supporting the strap 3 upon the animal to which the device is applied.

What is claimed is:—

1. A device of the character described comprising a girdle, a strap fixedly secured thereto and extending rearwardly therefrom, a pricking device extending from the strap, a yieldable guard device surrounding the pricking device and normally holding the strap in raised position and the pricking device retracted thereinto, and a hook upon the free end of the strap.

2. A device of the character described comprising a girdle, a strap secured thereto and extending rearwardly therefrom, a plate secured upon the strap, a plurality of pricking devices extending from the plate and arranged transversely thereof, and yieldable guard devices surrounding the pricking devices and normally extending therebeyond, and a fence engaging device carried by the free end of the strap.

3. A device of the character described comprising a girdle, a strap secured thereto and extending rearwardly therefrom, a plate secured upon the strap, a plurality of pricking devices extending from the plate and arranged transversely thereof, yieldable guard devices surrounding the pricking devices and normally extending therebeyond, a fence engaging device carried by the free end of the strap, a breast piece connected to the girdle, a plurality of pricking devices secured thereto, and yieldable guard devices surrounding the pricking devices and disposed to contact with the breast of an animal and normally hold the pricking devices out of contact therewith.

In testimony that I claim the foregoing as my own, I have hereto affixed my signature in the presence of two witnesses.

CASWELL C. BUSH.

Witnesses:
S. H. POST,
T. WINTER.